Nov. 24, 1959     H. JACOB     2,913,968
MIRROR REFLEX CAMERA WITH BUILT-IN ELECTRIC EXPOSURE METER
Filed Nov. 21, 1955     2 Sheets-Sheet 1

Inventor:
Heinrich Jacob,
by Singer, Stern & Carlburg,
Attorneys.

Nov. 24, 1959     H. JACOB     2,913,968
MIRROR REFLEX CAMERA WITH BUILT-IN ELECTRIC EXPOSURE METER
Filed Nov. 21, 1955     2 Sheets-Sheet 2

Inventor:
Heinrich Jacob,
by Singer, Stern & Carlberg
Attorneys.

# United States Patent Office 2,913,968
Patented Nov. 24, 1959

2,913,968

MIRROR REFLEX CAMERA WITH BUILT-IN ELECTRIC EXPOSURE METER

Heinrich Jacob, Berlin-Zehlendorf, Germany, assignor to Zeiss Ikon A.G. Stuttgart, Stuttgart, Germany Application November 21, 1955, Serial No. 547,977

Claims priority, application Germany November 30, 1954

5 Claims. (Cl. 95—10)

This invention relates generally to a mirror reflex camera with a built-in electric exposure meter, the pointer of which is arranged so as to sweep over a suitable scale arranged along one edge of the field of view of the view finder.

More particularly this invention provides for the combining of a conventional exposure meter with the view finder of the camera so that the exposure meter may be read directly in the view finder while the image is being framed and sharply focused.

In this arrangement the instrument pointer may be arranged directly above or below the ground glass plate of the view finder and pivoted about an axis outside of the field of view to sweep in an arc substantially parallel to the plane of the ground glass plate. Preferably the body of the instrument is disposed in space provided at the front side of the camera in front of the view finder so that the instrument pointer which points toward the back of the camera and the scale associated therewith occupy a position in the view finder in the upper part of a picture being viewed therein. This position of the exposure instrument scale has been found to interfere the least with the proper viewing of the image in the view finder.

An advantage of this forward disposition of the exposure meter assembly resides in the compactness of the complete assembly which permits the disposition of the photoelectric cells of the exposure meter on opposite sides of the body of the instrument in the front of the camera to be irradiated by light reflected directly from the object to be photographed.

The exposure meter is arranged in a space outside of the view finder passage so as not to interfere with the field of view of the view finder. Furthermore the positioning of the exposure meter is such that it does not crowd the parts inside the camera, especially with regard to the optical paths between the objective lens system and the film, nor does the selected positioning of the exposure meter crowd the shutter and diaphragm mechanisms or other adjusting mechanisms.

In double lens reflex cameras, the view finder comprising the finder lens, the reflecting mirror and the ground glass plate on which the image is reflected, in known manner is frequently built as an enclosed unit into the camera and presents the characteristic box shape of this type of camera. The film is commonly arranged for vertical travel. The film spools or rolls are disposed in spaces on opposite sides of the light paths through the camera. Normally there is space in the spool spaces for housing the exposure meter assembly.

By positioning the exposure meter assembly in the forward part of the camera with the instrument pointer sweeping but a small arc along one edge of the ground glass plate of the view finder, the observation of the more important parts of the picture, which normally appear in the central region of the view finder is not disturbed. Further the exposure meter instrument scale lies in the upper part of the picture, the composition of which is usually not of such importance as the central subject matter which is, in most cases, the subject matter of photographic interest.

To direct more light on the ground glass plate some cameras provide a field lens, usually in the form of a stepped lens, also called a Fresnel lens, disposed to collect light in the view finder and direct it onto the ground glass plate. In such an arrangement the space between the view finder field lens and the ground glass plate provides an ideal space for the pointer of the instrument. This protects the instrument pointer from inadvertent mechanical damage and makes possible the use of dust tight seals, so that the exposure meter indicator may be clearly read at all times.

It is an object of the invention to design the view finder ground glass plate and exposure meter assembly as an integrated unit which fits into the camera. Further, since standard components are used it is feasible to fit these components into conventional cameras not originally provided with the described exposure meter facilities.

Another object of this invention is to provide an exposure meter assembly for a mirror reflex camera which may be read directly in the view finder of the camera.

A further object of this invention is to provide a mirror reflex camera with a built-in exposure meter readable in the camera view finder.

Other objects and advantages will become apparent from a study of the following specification when considered in conjunction with the accompanying drawings, in which.

Figure 2:
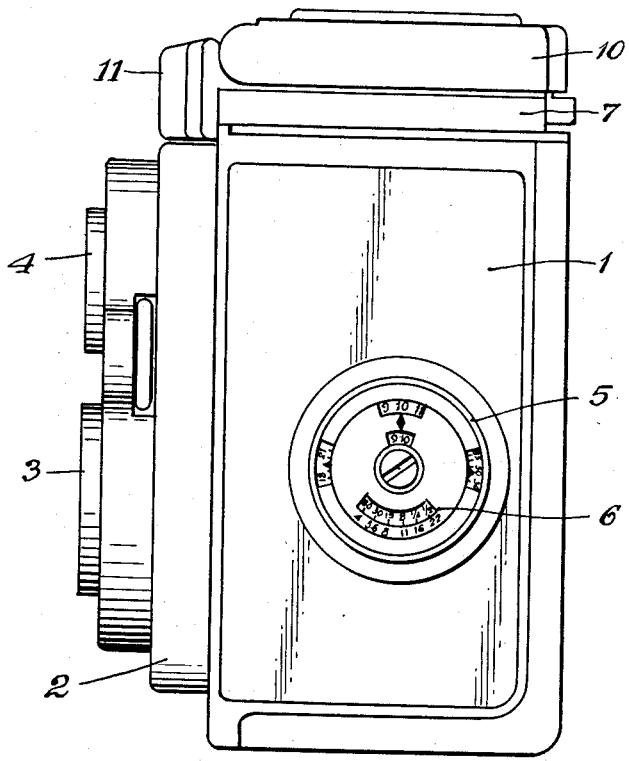
Figs. 2 and 3 are, respectively, a left side view and a top plan view of the camera shown in Fig. 1.

In the drawing, only such details of the camera which are important for an understanding of the present invention have been disclosed. The camera comprises a casing 1 which slidably encloses a lens carriage 2 which carries a picture lens 3 and a view finder lens 4. A focusing knob 5 mounted on the left side of the camera as shown in Fig. 2, adjusts the camera for the distance between the object to be photographed and the camera. Focusing is achieved by observation of the image in the view finder. Focusing adjustment is accomplished by sliding the lens carriage in and out of the camera casing 1 through suitable mechanical connections between the knob 5 and the lens carriage. These connections are conventional since not essential to an understanding of this invention, are not illustrated in the interest of simplicity. The central area of the focusing knob 5, is provided with a calculating device to convert the exposure meter readings suitable diaphragm and shutter speed values.

Figure 1:
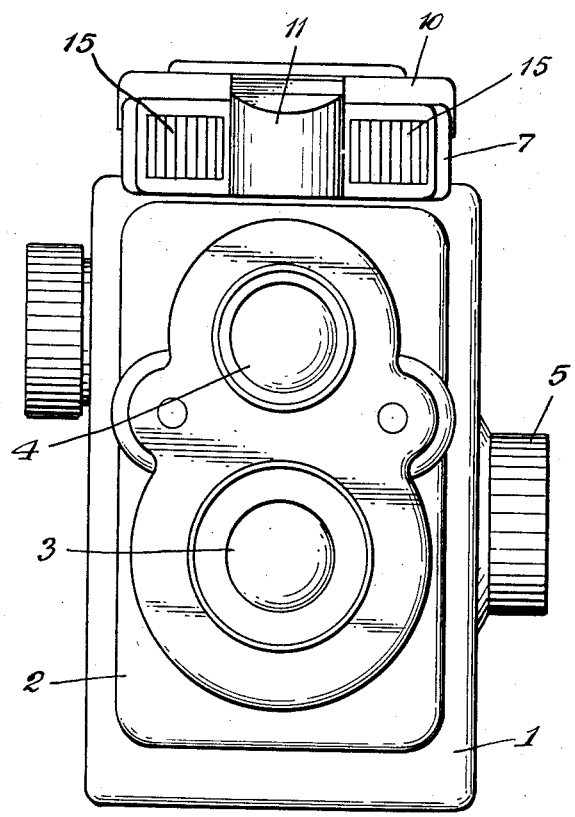
Fig. 1 is a front view of a double lens mirror reflex camera.
Figure 4:
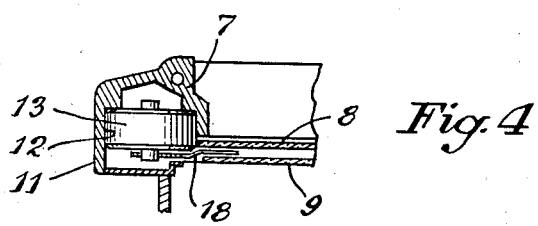
Fig. 4 is a sectional view taken on the line IV—IV of Fig. 3.
Figure 3:
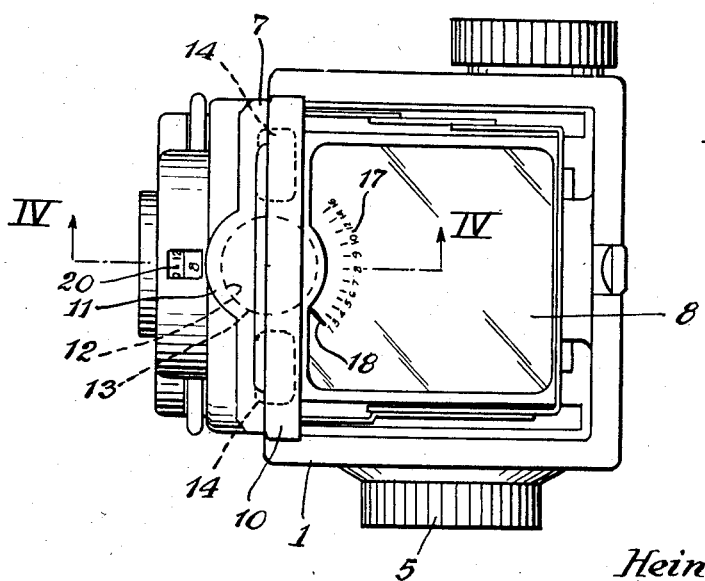

A finder head 7 is mounted on the upper part of the camera casing and as seen in Figs. 3 and 4 carries a horizontal ground glass image receiving plate 8 and a Fresnel type field lens 9 spaced from the ground glass plate 8 and arranged to direct light to the ground glass viewing plate. The view finder head 7 also mounts the shading flaps 10 which when raised shade the ground glass plate, to provide proper image viewing. These flaps 10 are shown in retracted position in Figs. 1 and 2 and in raised position in the top plan view of Fig. 3.

The front wall of the view finder head 7 is bulged outwardly in its center portion at 11 to provide a suitable recess 12 to receive a portion of a conventional measuring or indicating instrument 13 forming part of an exposure meter assembly. Opposite said outwardly extending bulge 11 is arranged a complementary bulge, so that said two bulges form a chamber to accommodate the entire body of the indicating instrument. The photoelectric cell 14 which forms a part of the exposure meter assembly is located on opposite sides of the bulge 11 which receives the indicating instrument body. No attempt has been made to indicate the accurate outline of this photoelectric cell since its configuration is of no importance. The photoelectric cell 14 is, however, arranged in two parts in rear of windows open through the front of the view finder head 7 and are screened or provided with shutters 15 which may or may not be movable to cover and expose the photoelectric cells as desired or required.

An instrument scale 17 is applied to the forward part of the ground glass viewing plate 8, as shown in Fig. 3. The scale 17 may be calibrated in suitable units of light intensity. Pointer 18 of instrument 13 sweeps over this scale. Thus the intensity of the light reflected from the object being viewed is indicated in the field of view of the finder and since the exposure meter is pointed by the camera, the indications of the exposure meter are inherently free of errors frequently existing through improper pointing of those types of exposure meters which are used independently of the camera. Interferences with view finding and proper observation of the object being viewed are minimized by displacement of the scale into the upper part of the view finder glass. Thus the items of interest in the central portions of the picture and, hence in the central portion of the view finder are not confused with the instrument scale 17.

As is shown in Fig. 4, the pointer 18 of the instrument moves between the ground glass plate 8 and the field lens 9.

To avoid covering of the window 20 in which scales are visible which show adjustments of diaphragm opening and shutter speed the indicating instrument 13 is allowed to project slightly into the image field of the view finder. This marginal projection, however, is so slight that it does not interfere with a satisfactory viewing.

Although this invention has been illustrated and described in connection with a specific type of camera it will be appreciated by those skilled in the art that it is equally applicable to a single lens mirror reflex camera. Similarly this invention is not limited to the details of its components such as indicating instruments, photocells etc., nor in the organization of such details. Accordingly it is intended that the foregoing disclosure shall be considered only as illustrative and not considered in a limiting sense.

I claim as my invention:

1. In a mirror reflex camera, the combination of a camera casing, a reflex finder mounted on top of said casing, said reflex finder including a view finder head with a horizontal focusing screen mounted therein, and a finder lens, a slidable lens carriage in said camera casing, said finder lens and a picture lens being mounted on said lens carriage, said finder lens projecting an image of the object to be photographed onto said focusing screen, means for adjusting said lens carriage, a window on said lens carriage through which scales are visible from above for indicating the adjustment of exposure values, a photoelectric exposure meter provided with an indicating instrument and a photoelectric cell mounted on said view finder head, said view finder head having a front wall provided with an outwardly extending bulge and a complementary inwardly extending bulge in its center portion, said outwardly extending bulge in all adjusted positions of said lens carriage leaving said window on said carriage unobstructed, said bulges forming a recess for accommodating therein the entire body of said indicating instrument, said indicating instrument having a pointer movable in a horizontal plane, the free end of said pointer being adapted to move over a scale provided on the marginal portion of said horizontal focusing screen, whereby the indication of said indicating instrument can be read when the finder image is viewed.

2. In a mirror reflex camera, the combination of a camera casing, a reflex finder mounted on top of said casing, said reflex finder including a view finder head with a horizontal focusing screen mounted therein, and a finder lens, a slidable lens carriage in said camera casing, said finder lens and a picture lens being mounted on said lens carriage, said finder lens projecting an image of the object to be photographed onto said focusing screen, means for adjusting said lens carriage, a window on said lens carriage through which scales are visible from above for indicating the adjustment of exposure values, a photoelectric exposure meter provided with an indicating instrument and a photoelectric cell mounted on said view finder head, said view finder head having a front wall provided with an outwardly extending bulge in its center portion, said outwardly extending bulge in all adjusted positions of said lens carriage leaving said window on said carriage unobstructed, said photoelectric cell being mounted on the front wall of said view finder head to one side of the bulge in said front wall, said bulge forming a recess for accommodating therein a portion of said indicating instrument, the other portion of which extends into the adjacent portion of said focusing head, said indicating instrument having a pointer movable in a horizontal plane, the free end of said pointer being adapted to move over a scale provided on the marginal portion of said horizontal focusing screen, whereby the indication of said indicating instrument can be read when the finder image is viewed.

3. In a mirror reflex camera, the combination of a camera casing, a reflex finder mounted on top of said casing, said reflex finder including a view finder head with a horizontal focusing screen mounted therein, and a finder lens, a slidable lens carriage in said camera casing, said finder lens and a picture lens being mounted on said lens carriage, said finder lens projecting an image of the object to be photographed onto said focusing screen, means for adjusting said lens carriage, a window on said lens carriage through which scales are visible from above for indicating the adjustment of exposure values, a photoelectric exposure meter provided with an indicating instrument and a photoelectric cell mounted on said view finder head, said view finder head having a front wall provided with an outwardly extending bulge in its center portion, said outwardly extending bulge in all adjusted positions of said lens carriage leaving said window on said carriage unobstructed, one portion of said photoelectric cell being mounted on the front wall of said view finder head to one side of the bulge therein, while the remaining portion of said photoelectric cell is mounted on the front wall of said view finder head to the other side of said bulge, said bulge forming a recess for accommodating therein a portion of said indicating instrument, the other portion of which extends into the adjacent portion of said focusing head, said indicating instrument having a pointer movable in a horizontal plane, the free end of said pointer being adapted to move over a scale provided on the adjacent marginal portion of said horizontal focusing screen, whereby the indication of said indicating instrument can be read when the finder image is viewed.

4. In a mirror reflex camera, the combination of a camera casing, a reflex finder mounted on top of said casing, said reflex finders including a view finder head with a horizontal focusing screen mounted therein, and a finder lens, a slidable lens carriage in said camera casing, said finder lens and a picture lens being mounted on said lens carriage, said finder lens projecting an image of the object to be photographed onto said focusing screen, means for adjusting said lens carriage, a window on said lens carriage through which scales are visible from above for indicating the adjustment of exposure values, a photoelectric exposure meter provided with an indicating instrument and a photoelectric cell mounted on said view finder head, said view finder head having a front wall provided with an outwardly extending bulge and a complementary inwardly extending bulge in its center portion, said outwardly extending bulge in all adjusted positions of said lens carriage leaving said window on said carriage unobstructed, one portion of said photoelectric cell being mounted on the front wall of said view finder head to one side of the outwardly extending bulge therein, while the other portion of said photoelectric cell is mounted on the front wall of said view finder head to the other side of said outwardly extending bulge, said two bulges forming a recess for accommodating therein the entire body of said indicating instrument, said indicating instrument having a pointer movable in a horizontal plane, the free end of said pointer being adapted to move over a scale provided on the adjacent marginal portion of said horizontal focusing screen, whereby the indication of said indicating instrument can be read when the finder image is viewed.

5. In a mirror reflex camera, the combination of a camera casing, a reflex finder mounted on top of said casing, said reflex finder including a view finder head with a horizontal focusing screen mounted therein, and a finder lens, a slidable lens carriage in said camera casing, said finder lens and a picture lens being mounted on said lens carriage, said finder lens projecting an image of the object to be photographed onto said focusing screen, means for adjusting said lens carriage, a photoelectric exposure meter provided with an indicating instrument and a photoelectric cell mounted on said view finder head, said view finder head having a front wall provided with an outwardly extending bulge and a complementary inwardly extending bulge in its center portion, said bulges forming a recess for accommodating therein the entire body of said indicating instrument, said indicating instrument having a pointer movable in a horizontal plane, the free end of said pointer being adapted to move over a scale provided on the marginal portion of said horizontal focusing screen, whereby the indication of said indicating instrument can be read when the finder image is viewed.

References Cited in the file of this patent

UNITED STATES PATENTS

| | | |
|---|---|---|
| 2,241,020 | Nervin | May 6, 1941 |
| 2,252,573 | Leitz et al. | Aug. 12, 1941 |
| 2,330,613 | Nuchterlein | Sept. 28, 1943 |
| 2,387,466 | Rath | Oct. 23, 1945 |

FOREIGN PATENTS

| | | |
|---|---|---|
| 878,104 | France | Sept. 28, 1942 |
| 993,968 | France | Aug. 3, 1951 |
| 698,004 | Great Britain | Oct. 7, 1953 |
| 1,073,586 | France | Mar. 24, 1954 |